(12) United States Patent
Dunaisky et al.

(10) Patent No.: US 9,754,561 B2
(45) Date of Patent: Sep. 5, 2017

(54) MANAGING MEMORY REGIONS TO SUPPORT SPARSE MAPPINGS (71) Applicant: NVIDIA CORPORATION, Santa Clara, CA (US)

(72) Inventors: Jonathan Dunaisky, Fort Collins, CO (US); Henry Packard Moreton, Woodside, CA (US); Jeffrey A. Bolz, Austin, TX (US); Yury Y. Uralsky, Santa Clara, CA (US); James Leroy Deming, Madison, AL (US); Rui M. Bastos, Porto Alegre (BR); Patrick R. Brown, Wake Forest, NC (US); Amanpreet Grewal, Lancaster, NY (US); Christian Amsinck, Durham, NC (US); Poornachandra Rao, Cedar Park, TX (US); Jerome F. Duluk, Jr., Palo Alto, CA (US); Andrew J. Tao, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 447 days.

(21) Appl. No.: 14/046,064

(22) Filed: Oct. 4, 2013

(65) Prior Publication Data
US 2015/0097847 A1 Apr. 9, 2015

(51) Int. Cl.
G06T 1/60 (2006.01)
G06F 12/08 (2016.01)
G06F 12/10 (2016.01)
G09G 5/39 (2006.01)
G06F 12/0897 (2016.01)
G06F 12/1027 (2016.01)

(52) U.S. Cl.
CPC ........... G09G 5/39 (2013.01); G06F 12/0897 (2013.01); G06F 12/1027 (2013.01); G06T 1/60 (2013.01)

(58) Field of Classification Search
None
See application file for complete search history.

(56) References Cited

U.S. PATENT DOCUMENTS

2006/0230223 A1* 10/2006 Kruger et al. ............... 711/6
2008/0106552 A1* 5/2008 Everitt ....................... 345/552
(Continued)

Primary Examiner — Maurice L McDowell, Jr.
Assistant Examiner — Donna J Ricks
(74) Attorney, Agent, or Firm — Artegis Law Group, LLP (57) ABSTRACT One embodiment of the present invention includes a memory management unit (MMU) that is configured to manage sparse mappings. The MMU processes requests to translate virtual addresses to physical addresses based on page table entries (PTEs) that indicate a sparse status. If the MMU determines that the PTE does not include a mapping from a virtual address to a physical address, then the MMU responds to the request based on the sparse status. If the sparse status is active, then the MMU determines the physical address based on whether the type of the request is a write operation and, subsequently, generates an acknowledgement of the request. By contrast, if the sparse status is not active, then the MMU generates a page fault. Advantageously, the disclosed embodiments enable the computer system to manage sparse mappings without incurring the performance degradation associated with both page faults and conventional software-based sparse mapping management.

22 Claims, 6 Drawing Sheets (56) References Cited

U.S. PATENT DOCUMENTS

| | | | |
|---|---|---|---|
| 2009/0172344 A1* | 7/2009 | Grochowski et al. | 711/207 |
| 2012/0036334 A1* | 2/2012 | Horman et al. | 711/165 |
| 2012/0147028 A1* | 6/2012 | Frisinger | G09G 5/00 345/587 |
| 2015/0089146 A1* | 3/2015 | Gotwalt et al. | 711/133 |

* cited by examiner

MANAGING MEMORY REGIONS TO SUPPORT SPARSE MAPPINGS

BACKGROUND OF THE INVENTION

Field of the Invention

Embodiments of the present invention relate generally to graphics processing and, more specifically, to managing memory regions to support sparse mappings.

Description of the Related Art

A typical computer system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering 3-D scenes, much faster than a CPU. However, the specialized design of these GPUs also limits the types of tasks that the GPU can perform. By contrast, the CPU is typically a more general-purpose processing unit and therefore can perform most tasks. Consequently, the CPU usually executes the overall structure of a software application and then configures the GPU to implement a graphics processing pipeline that transform 3-D images generated by the software application into rendered 2-D images.

During execution of the software application, representations of surfaces, known as "textures," and other data associated with the graphics processing pipeline are typically stored in a graphics memory that is coupled to the GPU. However, increasingly, the complexity and resolution of textures exceeds the storage capacity of the graphics memory. Further, the software application often does not require access to all of the data included in all of the textures. Consequently, the software application may specify "sparse textures," where only selected portions of the texture data are resident in the graphics memory.

One limitation to using sparse textures instead of textures that are fully resident in the graphics memory is that if the software application attempts to access sparse texture data that is not resident in the graphics memory, then a page fault is generated. The computer system may attempt to remedy the page fault by performing actions to map the data to an appropriate location in the graphics memory. However, remedying a page fault typically results in undesirable latency, often unacceptably degrading the performance of the software application. Alternatively, if the computer system does not remedy the page fault, then the software application may exhibit undesirable behavior, such as unexpectedly terminating.

In one approach to ensuring that the software application does not access sparse texture data that is not resident in the graphics memory, the software application generates an ancillary data structure that is designed to manage and track the sparse textures. In particular, the ancillary data structure represents the portions of the sparse textures that are resident in the graphics memory and the portions of the sparse textures that are not resident in the graphics memory. In operation, before accessing any data that is included in a sparse texture, the software application accesses the ancillary data structure. If the ancillary data structure indicates that the data is not resident in the graphics memory, then the software application proceeds without accessing the data.

Although this approach to managing sparse textures may avoid page faults associated with sparse textures, this approach does not necessarily address the performance degradation associated with spare textures. In particular, creating, maintaining, and traversing the ancillary data structure may significantly reduce the speed at which the software application executes. Further, incorporating an ancillary data structure into the code of the software application is tedious, time consuming, and error-prone. Notably, such an approach to managing sparse textures and, consequently, the limitations of this approach is generally applicable to managing sparse mappings associated with many types of graphics data (e.g., render targets).

Accordingly, what is needed in the art is a more effective technique for managing sparse mappings.

SUMMARY OF THE INVENTION

One embodiment of the present invention includes a system configured to manage sparse mappings. The system includes a memory that includes a page table with multiple page table entries, and a memory management unit coupled to the memory and configured to receive a first request to translate a first virtual memory addresses to a first physical memory address, select a first page table entry included in the multiple page table entries based on the first virtual memory address, determine that the first page table entry does not include a first mapping that is associated with the first virtual memory address, determine that the first page table entry is associated with an active sparse status, set the first physical memory address based on the whether the first request is a write operation, and generate an acknowledgement of the first request.

One advantage of the disclosed techniques is that the computer system efficiently and deterministically manages sparse mappings. Notably, by directing different types of access requests to different memory pages, the MMU ensures the correct processing of each access request. Advantageously, because the memory management unit (MMU) does not signal page faults that would be associated with accesses to sparse data in conventional techniques, the undesirable latency typically associated with such page faults is eliminated. Further, since the computer system implements the sparse data memory management in hardware, the time required to execute a software application is reduced compared to a computer system that implements conventional software-based sparse data memory management.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
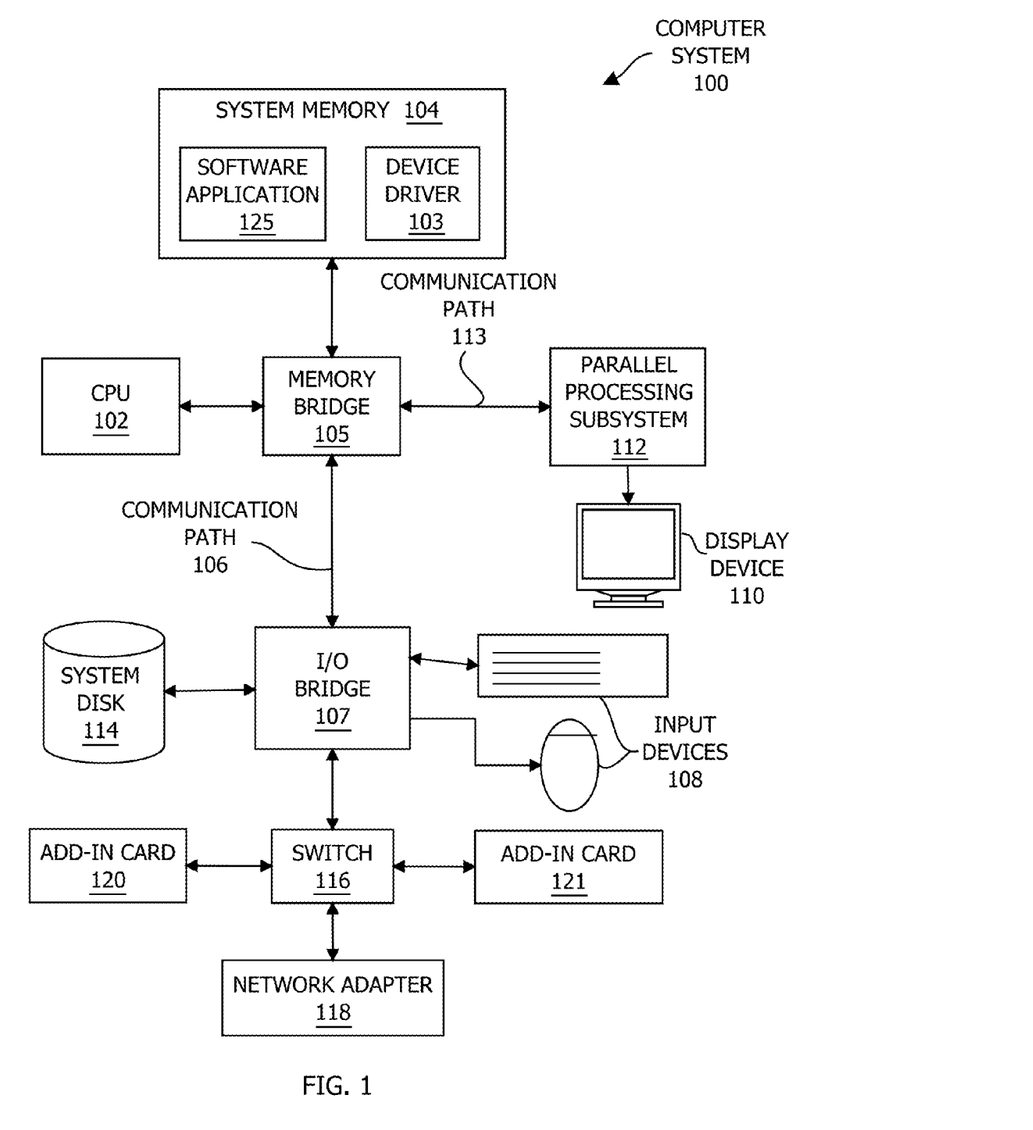
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
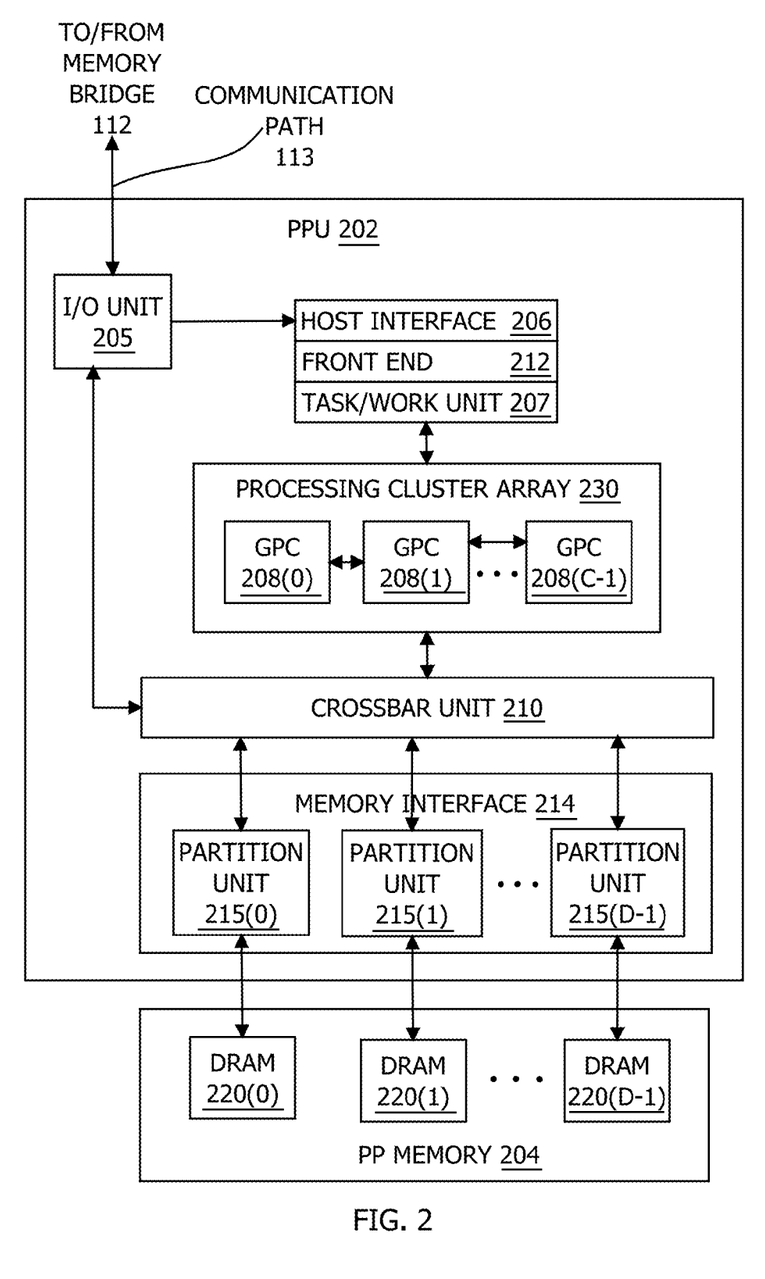
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
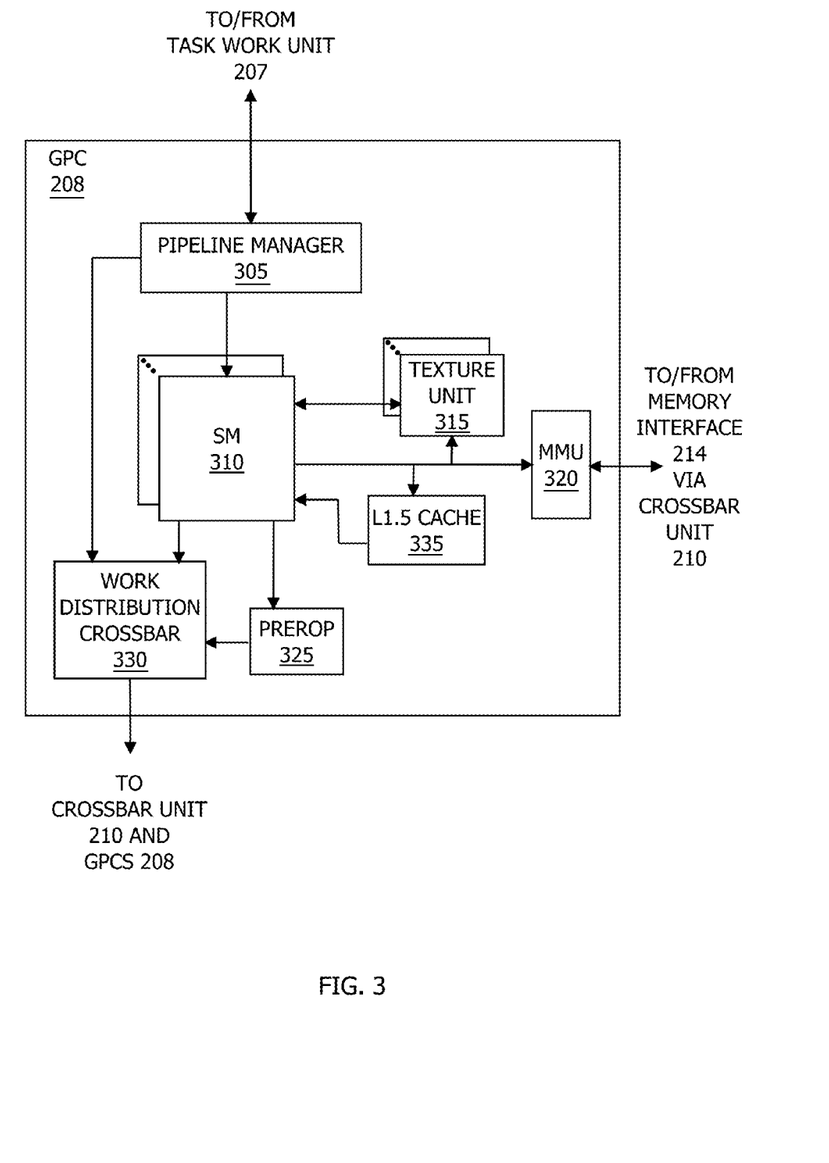
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Managing Sparse Mappings

Again, the software application 125 configures the PPU 202 to execute a large number of threads in parallel to perform graphics, general processing and/or compute operations. In operation, the PPU 202 typically transfers data from the system memory 104 to the PP memory 204, processes the data, and writes results back to the PP memory 204 or the system memory 104. Often, the software application 125 does not require the PPU 202 to access all of the data associated with a specific representation of a surface. For instance, the PPU 202 may not need to access all of the data associated with one or more textures, render targets, depth buffers, stencil buffers, vertex buffers, index buffers, stream out buffers, buffers indirectly specifying primitive topology, or source or destination buffers for copies. In such a scenario, to reduce the amount of PP memory 204 required to store the data, the software application 125 may specify a sparse mapping, such as a sparse texture. For instance, in sparse textures, only selected portions of the texture data are resident in the PP memory 204.

Advantageously, if the software application 125 configures the PPU 202 to access sparse data that is not resident in the PP memory 204, then the PPU 202 operates in a default, predictable manner without generating a page fault. In one embodiment, if a thread executing in the PPU 202 attempts to perform a write operation on sparse texture data that is not resident in the PP memory 204, then the MMU 320 directs the thread to access a PP memory 204 location that is associated with sparse texture write operations. Further, if a thread executing in the PPU 202 attempts to perform a read operation or an atomic operation on sparse texture data that is not resident in the PP memory 204, then the MMU 320 directs the thread to access a PP memory 204 a location that stores a value of binary zero. In this fashion, the MMU 320 efficiently ensures that accessing sparse data is both successful and has deterministic results.

By contrast, in conventional computer systems, if the software application configures a PPU to attempt to access sparse texture data that is not resident in an associated PP memory, then an MMU generates a page fault. As previously outlined, remedying the page fault may result in undesirable latency while not remedying the page fault may result in the software application unexpectedly terminating. Further, although the software application may track the sparse data to ensure that the PPU does not attempt to access sparse texture data, such an approach negatively impacts the speed at which the software application executes.

As persons skilled in the art will understand, embodiments of the invention include PPUs 202 in which accessing any type of data that is not resident in the PP memory 204 and is identified as sparse is handled in a deterministic fashion without generating a page fault. In alternate embodiments, any unit included in the PPU 202 may be configured to intercept requests to access sparse data that is not resident in the PP memory 204 and, subsequently, process the request in any technically feasible fashion. For instance, the texture unit 315 may discard write operations and substitute a value of zero for read operations on sparse data that is not resident in the PP memory 204. Similarly, a ROP unit may discard write operations and substitute a depth test failure for read operations on sparse data that is not resident in the PP memory 204. In alternate embodiments, the ROP unit may substitute a constant value for depth read operations on sparse data that is not resident in the PP memory 204. In general, the ROP unit may be programmed to process sparse data that is not resident in the PP memory 204 in any technically feasible fashion.

Figure 4:
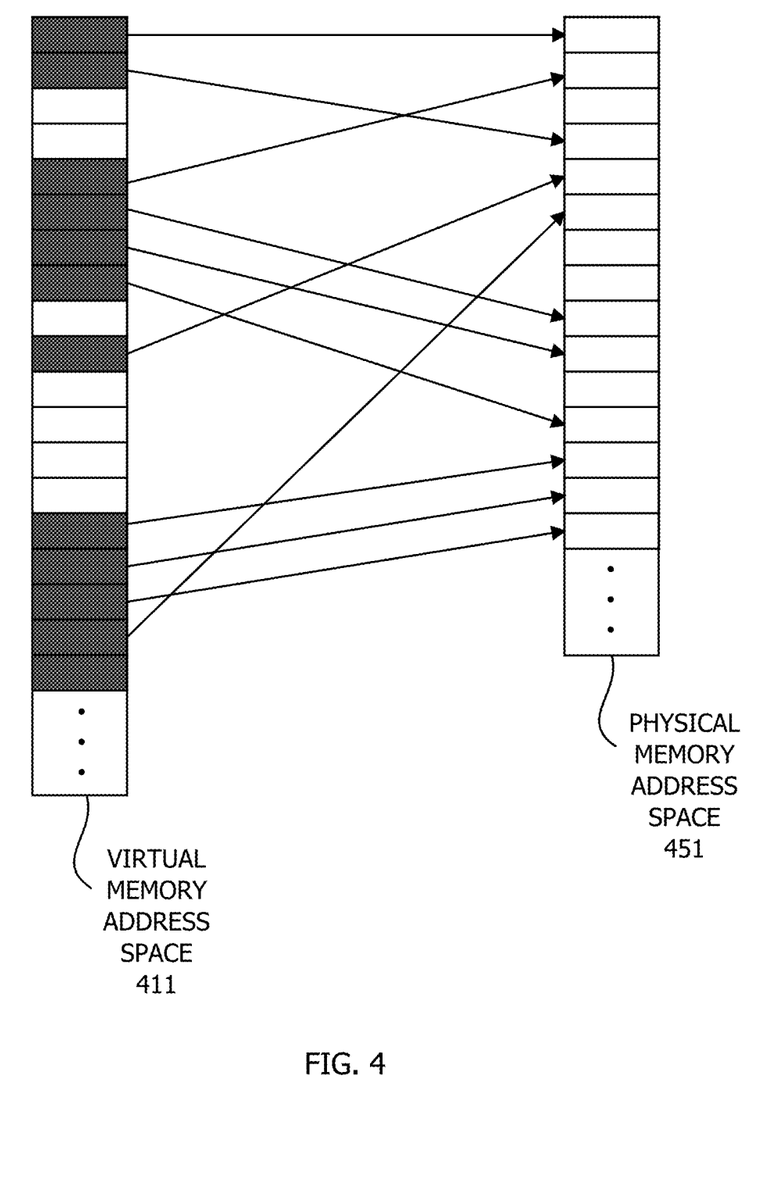
FIG. 4 is a conceptual diagram illustrating how a virtual memory address space may be mapped to a physical memory address space, according to one embodiment of the present invention.

FIG. 4 is a conceptual diagram illustrating how a virtual memory address space 411 may be mapped to a physical memory address space 451, according to one embodiment of the present invention. Notably, the virtual memory address space 411 corresponds to a sparse texture.

The pages of the virtual memory address space 411 that are not resident in the PP memory 204 of FIG. 2 are represented as unfilled boxes. By contrast, the pages of the virtual memory address space 411 that are resident in the PP memory 204 are represented as filled boxes. Further, the mappings between the pages of the virtual memory address space 411 that are resident in the PP memory 204 and the locations of the corresponding pages in the physical memory address space 451 are represented with arrows. As shown, using sparse textures may dramatically reduce the amount of the PP memory 204 required to store the required portions of texture data compared to using textures where all of the texture data is stored in the PP memory 204.

As also shown, the PP memory 204 is allocated to portions of the sparse texture at the granularity of a page. In alternate embodiments, the PPU 202 may allocate the PP memory 204 to portions of the sparse texture at any granularity. For example, the PPU 202 may allocate the PP memory 204 at the granularity of a raster tile or a cache tile. The size of a tile may be based on a number of factors, including the quantity and configuration of render targets, the quantity of samples per pixel, and whether the data stored in the cache tile is compressed.

Figure 5:
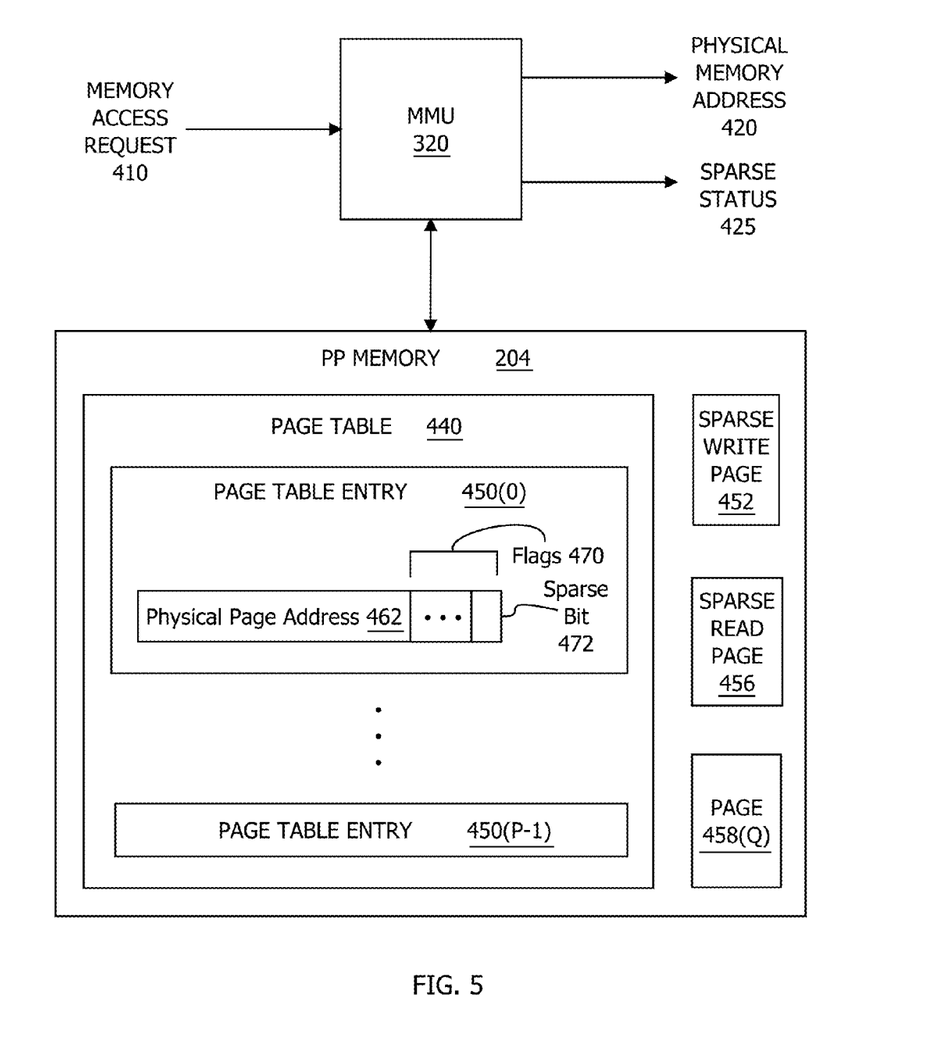
FIG. 5 is a conceptual diagram illustrating how the memory management unit of FIG. 3 may process a memory access request, according to one embodiment of the present invention.

FIG. 5 is a conceptual diagram illustrating how the memory management unit 320 of FIG. 3 may process a memory access request 410, according to one embodiment of the present invention. In operation, a thread executing in a unit included in the PPU 202 generates the memory access request 410 as part of an attempt to perform an operation via a particular virtual memory address. Upon receiving the memory access request 410, the MMU 320 attempts to translate the virtual memory address into a physical memory address 420. The physical memory address 420 is required to access data stored in the PP memory 204.

As shown, the PP memory 204 includes, without limitation, a page table 440, a sparse write page 452, a sparse read page 456, and one or more additional pages 458. Further, the page table 440 includes one or more page table entries (PTEs) 450. In alternate embodiments, the PP memory 204 may include more than one page table 440 and a page directory that reference the page tables 440. In some embodiments, a single or multiple-level cache hierarchy, such as a single or multiple-level translation look-aside buffer (TLB) hierarchy (not shown), may be implemented to cache virtual address translations for the page table 440.

To translate the virtual memory address to the physical memory address 420, the MMU 320 first performs a lookup operation on the page table 440 to determine the PTE 450 associated with the virtual memory address. In addition to the virtual memory address, the memory access request 410 may also indicate the virtual memory address space 411. In some embodiments, the PPU 202 may implement multiple virtual memory address spaces 411, each of which is assigned to one or more threads. Virtual memory addresses are unique within any given virtual memory address space 411.

The PTE 450 may or may not include a physical page address 462 that provides a mapping between the virtual memory address and the physical memory address 420. If the page table 440 includes the physical page address 462, then the MMU 320 determines the physical memory address 420 associated with the virtual memory address based on the physical page address 462. Subsequently, if the type of the memory access request 410 is permitted, then the MMU 320 provides the physical memory address 420 to the requesting thread, and generates an acknowledge of the memory access request 410. To determine whether the type of the memory access request 410 is permitted, the MMU 320 compares the values of one or more flags 470 included in the PTE 450 to the type of the memory access request 410. For example, if the type of the memory access request 410 is a write operation and the flags 470 include a write disable bit of value '0,' then the MMU 320 determines that the type of the memory access request 410 is permitted. By contrast, if the type of the memory access request 410 is not permitted, then the MMU 320 generates a page fault.

However, if the PTE 450 associated with the virtual memory address does not include the physical page address 462, then the MMU 320 performs a read operation on a sparse bit 472 included in the flags 470. Advantageously, the sparse bit 472 indicates whether the requesting thread expects that the data accessed via the virtual memory address is stored in the PP memory 204. The sparse bit 472 may be set in any technically feasible fashion. For instance, the software application 125 may specify the virtual addresses associated with sparse textures—textures in which only a portion of the texture is stored in the PP memory 204. Subsequently, the device driver 103 may activate (i.e. set to a value of binary '1') the sparse bits 472 included in the PTEs 450 associated with these virtual addresses. In alternate embodiments, the device driver 103 may also activate sparse bits included in the page directory entry associated with the page table 440 to reflect that the entire range mapped by the page directory entry represents sparse data. In such embodiments, the MMU 320 may read the sparse bits 472 included in page directories entries to determine whether the software application 125 expects that the data accessed via the virtual memory address is stored in the PP memory 204.

If the MMU 320 determines that the sparse bit 472 is not active, then the MMU 320 processes the memory access request 410 in the conventional manner. More specifically, since the PTE 450 associated with the virtual memory address does not include the physical page address 462, then the MMU 320 generates a page fault.

Advantageously, if the MMU 320 determines that the sparse bit 472 is active, then the MMU 320 processes the memory access request 410 in a manner that efficiently produces a deterministic and correct result. Notably, the MMU 320 processes the memory access request 410 based on the type of the memory access request 410. The MMU 320 differentiates between the following types of memory access requests 410: write operations, read operations, atomic operations, and any other read-modify-write operations. In general, the MMU 320 distinguishes between memory access requests 410 that return data to the requesting unit and memory access requests 410 that do not return data to the requesting unit. Further, the MMU 320 distinguishes between memory access requests 410 that are intended to modify data included in memory and memory access requests 410 that are not intended to modify data included in memory.

If the MMU 320 determines that the type of the memory access request 410 is a read operation, then the MMU 320 sets the physical memory address 420 to a location in the PP memory 204 that stores a value of binary 0. By contrast, if the MMU 320 determines that the type of the memory access request 410 is a write operation, then the MMU 320 sets the physical memory address 420 to a location in the PP memory 204 that is not expected to include valid data. Thus, the requesting thread may perform write operations via the physical memory address 420 without corrupting any data.

If the MMU 320 determines that the type of the memory access request 410 is an atomic operation or other read-modify-write operation, then the MMU 320 inhibits write operations to any location in the PP memory 204. Further, if the type of the memory access request 410 is an atomic operation or other read-modify-write operation that is associated with returning data, then the then the MMU 320 sets the physical memory address 420 to a location in the PP memory 204 that stores a value of binary 0.

In operation, if the MMU 320 determines that the type of the memory access request 410 is a read operation (or other operation that is associated with returning memory data), then the MMU 320 sets the physical memory address 420 based on the physical page address of the sparse read page 456. The sparse read page 456 is a zero-filled page (e.g., a page having all binary zeroes) included in the PP memory 204. Similarly, if the MMU 320 determines that the type of the memory access request 410 is a write operation that is not associated with returning memory data, then the MMU 320 sets the physical memory address 420 based on the physical page address of the sparse write page 452. The sparse write page 452 is a page included in the PP memory 204 that stores "dummy" data—data that will not be accessed as part of a read operation. Notably, multiple virtual addresses may be mapped to each physical memory address associated with either the sparse read page 456 or the sparse write page 452. Regardless of the type of the memory access request 410, if the MMU 320 determines that the sparse bit 472 is active, then the MMU generates an acknowledgement of the memory access request 410.

In alternate embodiments, the PPU 202 may specify virtual memory addresses representing data that is not expected to be stored in the PP memory 204 in any technically feasible fashion. In one embodiment, the PPU 202 may repurpose an existing bit included in the flags 470. Further, the MMU 320 may respond to memory access requests 410 associated with virtual memory addresses representing data that is not expected to be stored in the PP memory 204 in any predictable fashion. For instance, in alternate embodiments, the MMU 320 may not reserve the sparse read page 456 in the PP memory 204. Instead, the MMU 320 may set the physical memory address 420 to correspond to any consistent value in any technically feasible fashion. In some alternate embodiments, if the MMU 320 determines that the sparse bit 472 associated with the memory access request 410 is active, then the MMU 320 does not set the physical memory address 420. Instead the MMU 320 includes fixed-function hardware that suppresses write operations and returns zero data without accessing the PP memory 204

As shown, the MMU 320 may also provide a sparse status 425. The sparse status 425 reflects the value of the sparse bit 472 included in the PTE 450 associated with the virtual memory address. Advantageously, the sparse status 425 enables the MMU 320 to convey the value of the sparse bit 472 to other units included in the PPU 202. In operation, the MMU 320 provides the sparse status 425 as a field that is included in the acknowledgment of the memory access request 410. In some embodiments, clients (i.e., requesting units) of the MMU 320, such as the texture unit 315 or a raster operations (ROP) unit, cache translations between virtual memory addresses and the corresponding physical memory addresses 420. In such embodiments, these clients are "sparse-aware," and are configured such that subsequent reads to access data that is associated with the sparse status 425 do not return data. For instance, a sparse-aware client may suppress write operations and/or optimize read operations, bypassing the physical memory address 420 of "dummy" data that is provided by the MMU 320. In alternate embodiments, the MMU 320 may include logic to perform such optimizing operations. In some embodiments, prefetch operations are suppressed, and the MMU 320 is configured to return a special value to the requesting unit upon suppressing a prefetch operation.

In general, sparse-aware clients are configured to access the sparse status 425 included in the acknowledgement and track the sparse status 425 in a data cache. By contrast, many "naïve" units included in the PPU 202 are not configured to accept the sparse status 425 as a field that is included in the acknowledgement of the memory access request 410. In operation, when the memory access request 410 is associated with a "naïve" unit, MMU 320 will not provide the sparse status 425.

In alternate embodiments, the MMU 320 operates on a single or multiple-level cache hierarchy, such as a TLB hierarchy. In such embodiments, the MMU 320 may track the sparse status 425 throughout the cache hierarchy. The MMU 320 may track the sparse status 425 in any technically feasible fashion. For example, the MMU 320 may repurpose an existing bit included in the TLB entries.

Figure 6:
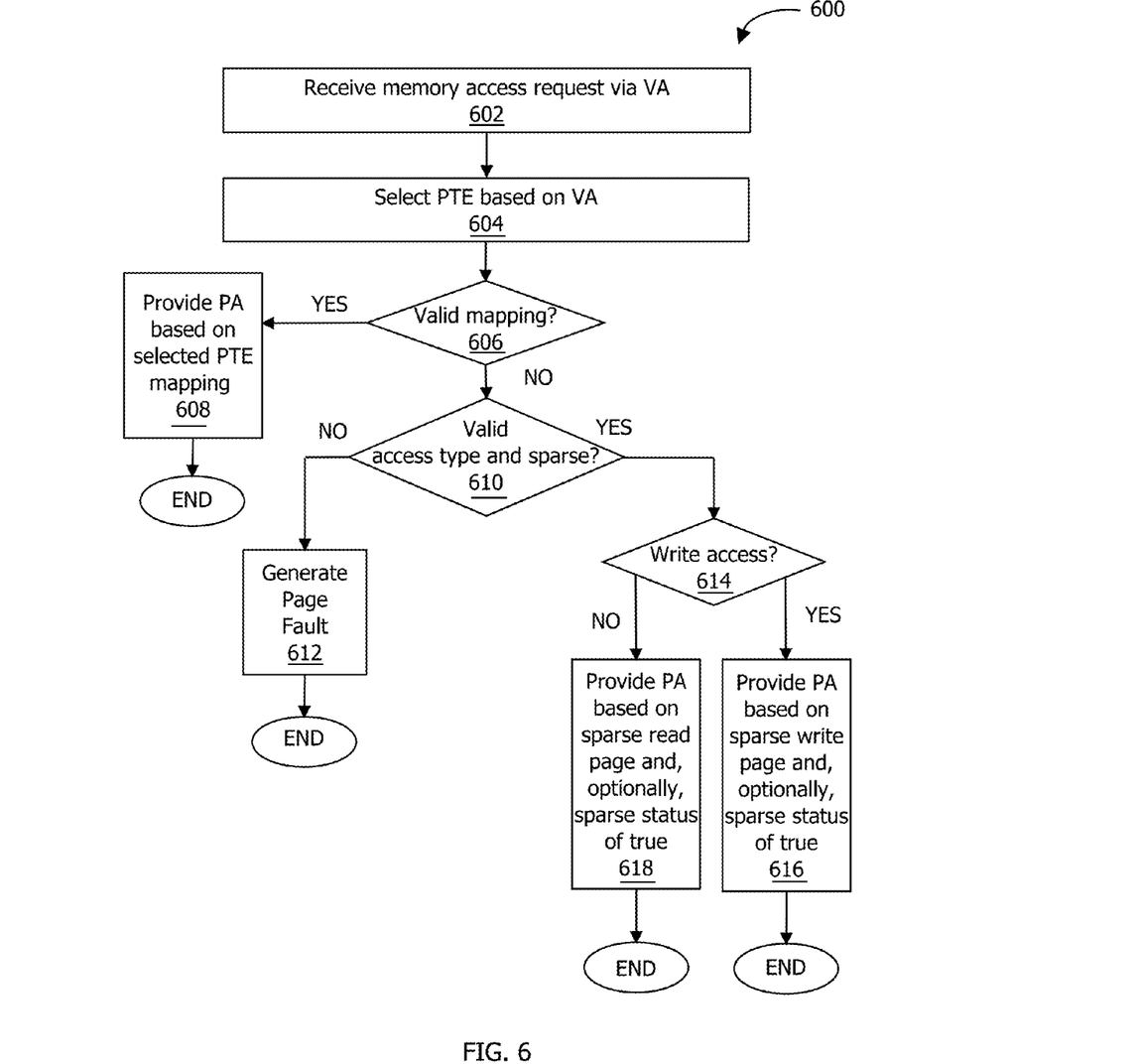
FIG. 6 is a flow diagram of method steps for processing a request to access data via a virtual memory address, according to one embodiment of the present invention.

FIG. 6 is a flow diagram of method steps for processing a request to access data via a virtual memory address, according to one embodiment of the present invention. Although the method steps are described with reference to the systems of FIGS. 1-5, persons skilled in the art will understand that any system configured to implement the method steps, in any order, falls within the scope of the present invention.

As shown, a method 600 begins at step 602, where the MMU 320 receives an input memory access request 410 via a virtual memory address (VA). The memory access request 410 may be associated with a thread that is executing in any unit included in the PPU 202, such as the texture unit 315. At step 604, the MMU 320 selects the PTE 450 that corresponds to the virtual memory address. The MMU 320 may select the PTE 450 in any technically feasible fashion, such as by performing look-up operations on one or more page tables 440. In some embodiments, a single or multiple-level cache hierarchy, such as a single or multiple-level translation look-aside buffer (TLB) hierarchy (not shown), may be implemented to cache virtual address translations for the page table 440.

At step 606, the MMU 320 determines whether the selected PTE 450 includes a valid mapping from the virtual memory address to the corresponding physical memory address 420. As part of step 606, the MMU 320 may evaluate one or more flags 470 included in the selected PTE 450 that indicate whether the type of the memory access request 410 is permitted. For example, if the type of the memory access request 410 is a write operation and a write disable bit included in the flags 470 is active, then the memory access request 410 is not permitted. If, at step 606, the MMU 320 determines that the selected PTE 450 includes a mapping associated with the virtual memory address and the type of the memory access request 410 is permitted, then the method 600 proceeds to step 608. At step 608, the MMU 320 performs a read operation on the mapping associated with the virtual memory address to determine the physical memory address 420 associated with the virtual memory address and provides that physical memory address 420 to the requesting thread. The MMU 320 then generates an acknowledgement of the memory access request 410 and, optionally, provides the sparse status 452 value of false. The method 600 then terminates.

If, at step 606, the MMU 320 determines that the selected PTE 450 does not include a mapping associated with the virtual memory address or the type of the memory access request 410 is not permitted, then the method 600 proceeds to step 610. At step 610, if the MMU 320 determines that the type of the memory access request is not permitted or the sparse bit 472 included in the selected PTE 450 is not active, then the method 600 proceeds to step 612. At step 612, since the selected PTE 450 does not include a mapping associated with the virtual memory address or the type of memory access is not permitted, then the MMU 320 is unable to translate the virtual memory address into a corresponding physical memory address 420. Consequently, the MMU 320 generates a page fault, and the method 600 terminates.

At step 610, if the MMU 320 determines that the type of the memory access request 410 is permitted and the sparse bit 472 is active, then the method 600 proceeds to step 614. As previously disclosed herein, an active sparse bit 472 indicates that the software application 125 does not intend for the virtual memory address to be mapped to a particular physical memory address. At step 614, if the MMU 320 determines that the type of the memory access request 410 is a write operation, then the method 600 proceeds to step 616. At step 616, the MMU 320 identifies the sparse write page 452 included in the PP memory 204. The MMU 320 then determines the physical memory address 420 associated with the virtual memory address based on the sparse write page 452, and provides that physical memory address 420 to the requesting thread. If the unit that the requesting thread is executing within (the requesting unit) includes the sparse status 425 as a field in the acknowledgement of the memory access request 410, then the MMU 320 sets the sparse status 425 to true. If the requesting unit is a "naïve" unit that does not include the sparse status 425 as a field in the acknowledgement of the memory access request 410, then the MMU 320 does not provide the sparse status 425. The MMU 320 then generates an acknowledgement of the memory access request 410, and the method 600 terminates.

At step 614, if the MMU 320 determines that the type of the memory access request 410 is a read operation, then the method 600 proceeds to step 618. At step 618, the MMU 320 identifies the zero-filled sparse read page 456 included in the PP memory 204. The MMU 320 then determines the physical memory address 420 associated with the virtual memory address based on the sparse read page 456, and provides that physical memory address 420 to the requesting thread. In alternate embodiments, the MMU 320 may provide the physical memory address 420 of any memory location that stores the value of binary zero. In yet other embodiments, the MMU 320 may cause the PP memory 204 to return zero to the requesting unit in any technically feasible fashion. Further, the MMU 320 may return any deterministic value to the requesting unit. For instance, the value may be programmable or dependent on the type of the memory access request 410, a field within the memory access request 410, of the type of the requesting unit. If the requesting unit includes the sparse status 425 as a field in the acknowledgement of the memory access request 410, then the MMU 320 sets the sparse status 425 to true. If the requesting unit is a "naïve" unit that does not include the sparse status 425 as a field in the acknowledgement of the memory access request 410, then the MMU 330 does not provide the sparse status 425. The MMU 320 then generates an acknowledgement of the memory access request 410, and the method 600 terminates.

In sum, the disclosed techniques enable software applications to select portions of data for storage in the PP memory without explicitly managing memory accesses associated with the remaining portions of data that are not selected for storage in the PP memory. In one instance, the software application designates the virtual memory addresses of a texture that is not intended to be completely stored in the PP memory. The driver activates a sparse bit included in the PTEs associated with these virtual memory addresses. Upon receiving a memory access request via a particular virtual memory address, the MMU performs a read operation on the PTE associated with the virtual memory address to determine whether the virtual memory address is mapped to a physical page that is resident in the PP memory. If the virtual memory address is mapped to the PP memory, then the MMU processes the memory access request in the convention fashion. More specifically, the MMU sets a physical memory address associated with the memory access request to the appropriate physical memory address and generates an acknowledgement of the memory access request.

If the virtual memory address is not mapped to the PP memory, the MMU performs a read operation on the sparse bit included in the PTE. If the sparse bit is not active, then the MMU generates a page fault. By contrast, if the sparse bit is active, then the MMU sets the physical memory address associated with the memory access to the physical memory address of a preconfigured page included in the PP memory. If the MMU determines that the type of the memory access request is a write operation, then the preconfigured page is a sparse write page. Alternatively, if the MMU determines that the type of the memory access request is a read operation or an atomic operation, then the preconfigured page is a sparse read page that includes all binary zeros. Further, if the MMU received the memory access request from a unit that includes a sparse status field in the acknowledgement, then the MMU sets the sparse status field to true. Finally, the MMU generates an acknowledgement of the memory access request.

Advantageously, the disclosed techniques enable the computer system to efficiently and deterministically support sparse mappings. Notably, the MMU does not signal page faults that would otherwise be associated with accesses to sparse data that is not stored the PP memory. Further, since the PPU implements sparse data memory management in hardware, the time required to execute a software application is significantly less than conventional techniques where the software application implements sparse data memory management. In addition, the disclosed techniques enable the software developer to use sparse data without generating specialized code to preemptively prevent undesirable behavior associated with accessing sparse data that is not resident in the PP memory.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A system configured to manage sparse mappings, the system comprising:
a memory that includes a page table having a plurality of page table entries; and
a memory management unit coupled to the memory for managing sparse mappings and configured to:
select a first page table entry included in the plurality of page table entries based on a first virtual memory address included in a first memory access request,
determine that the first page table entry does not include a mapping associated with the first virtual memory address,
determine that the first page table entry is associated with an active sparse status,
set a physical memory address requested for the first virtual memory address to a first physical memory address if the first memory access request comprises a write operation involving the first virtual memory address,
set the physical memory address requested for the first virtual memory address to a second physical memory address if the first memory access request comprises a non-write operation involving the first virtual memory address, and
generate an acknowledgement of the first memory access request.

2. The system of claim 1, wherein an active status bit included in the first page table entry indicates that the first page table entry is associated with the active sparse status.

3. The system of claim 1, wherein the memory further includes a page directory that includes a first page directory entry that specifies the page table, and an active status bit included in the first page directory entry indicates that the first page table entry is associated with the active sparse status.

4. The system of claim 1, wherein the first request is a write operation, and wherein setting the physical memory address requested for the first virtual memory address comprises determining a physical address associated with a sparse write page that is included in the memory.

5. The system of claim 4, wherein the memory management unit is further configured to:

receive a second request to translate a second virtual memory address to a physical memory address, wherein the second request also is a write operation, select a second page table entry included in the plurality of page table entries based on the second virtual memory address, determine that the second page table entry does not include a mapping that is associated with the second virtual memory address, determine that the second page table entry is associated with the active sparse status, set the physical memory address requested for the second virtual memory address to a physical address associated with the sparse write page, and generate an acknowledgement of the second request.

6. The system of claim 1, wherein the first request is at least one of a read operation and an atomic operation, and wherein setting the physical memory address requested for the first virtual memory address comprises determining a physical address associated with a zero-filled sparse read page included in the memory.

7. The system of claim 6, wherein the memory management unit is further configured to:

receive a second request to translate a second virtual memory address to a physical memory address, wherein the second request is at least one of a read operation and an atomic operation, select a second page table entry based on the second virtual memory address, determine that the second page table entry does not include a mapping that is associated with the second virtual memory address, determine that the second page table entry is associated with the active sparse status, set the physical memory address requested for the second virtual memory address to a physical address associated with the zero-filled sparse read page, and generate an acknowledgement of the second request.

8. The system of claim 1, wherein the memory management unit is further configured to set a sparse status field associated with the acknowledgement of the first request to indicate that the first page table entry is associated with the active sparse status.

9. The system of claim 8, further comprising:

a texture unit that is coupled to the memory management unit and is configured to:

receive the acknowledgement of the first request from the memory management unit, and update a data cache based on the sparse status field associated with the acknowledgement of the first request.

10. A computer-implemented method for managing sparse mappings, the method comprising:

accessing a page table having a plurality of page table entries, wherein the page table is included in a memory;

selecting a first page table entry included in the plurality of page table entries based on a first virtual memory address included in a first memory access request;

determining that the first page table entry does not include a first mapping associated with the first virtual memory address;

determining that the first page table entry is associated with an active sparse status;

setting a physical memory address requested for the first virtual memory address to a first physical memory address if the first memory access request comprises a write operation involving the first virtual memory address;

setting the physical memory address requested for the first virtual memory address to a second physical memory address if the first memory access request comprises a non-write operation involving the first virtual memory address; and generating an acknowledgement of the first request;
generate an acknowledgement of the first memory access request.

11. The method of claim 10, wherein an active status bit included in the first page table entry indicates that the first page table entry is associated with the active sparse status.

12. The method of claim 10, wherein the memory further includes a page directory that includes a first page directory entry that specifies the page table, and an active status bit included in the first page directory entry indicates that the first page table entry is associated with the active sparse status.

13. The method of claim 10, wherein the first request is a write operation, and wherein setting the first physical memory address requested for the first virtual memory address comprises determining a physical address associated with a sparse write page that is included in the memory.

14. The method of claim 13, further comprising:

receiving a second request to translate a second virtual memory address to a physical memory address, wherein the second request also is a write operation;

selecting a second page table entry included in the plurality of page table entries based on the second virtual memory address;

determining that the second page table entry does not include a second mapping that is associated with the second virtual memory address;

determining that the second page table entry is associated with the active sparse status;

setting the physical memory address requested for the second virtual memory address to a physical address associated with the sparse write page; and generating an acknowledgement of the second request.

15. The method of claim 10, wherein the first request is at least one of a read operation and an atomic operation, and wherein setting the physical memory address requested for the first virtual memory address comprises determining a physical address associated with a zero-filled sparse read page included in the memory.

16. The method of claim 15, further comprising:

receiving a second request to translate a second virtual memory address to a physical memory address, wherein the second request is at least one of a read operation and an atomic operation;

selecting a second page table entry based on the second virtual memory address;

determining that the second page table entry does not include a mapping that is associated with the second virtual memory address;

determining that the second page table entry is associated with the active sparse status;

setting the physical memory address requested for the second virtual memory address to a physical address associated with the zero-filled sparse read page; and generating an acknowledgement of the second request.

17. The method of claim 10, further comprising setting a sparse status field associated with the acknowledgement of the first request to indicate that the first page table entry is associated with the active sparse status.

18. The method of claim 17, wherein a memory management unit, for managing sparse mappings, generates the acknowledgement of the first request, and the method further comprises a texture unit receiving the acknowledgement of the first request, and the texture unit updating a data cache based on the sparse status field associated with the acknowledgement of the first request.

19. A computing device, comprising:
a processor;
a memory coupled to the processor and including a page table having a plurality of page table entries; and
a memory management unit associated with the processor for manacling sparse mappings and configured to:
select a first page table entry included in the plurality of page table entries based on a first virtual memory address included in a first memory access request,
determine that the first page table entry does not include a mapping associated with the first virtual memory address,
determine that the first page table entry is associated with an active sparse status,
set a physical memory address requested for the first virtual memory address to a first physical memory address if the first memory access request comprises a write operation involving the first virtual memory address,
set the physical memory address requested for the first virtual memory address to a second physical memory address if the first memory access request comprises a non-write operation involving the first virtual memory address, and
generate an acknowledgement of the first memory access request.

20. The computing device of claim 19, wherein an active status bit included in the first page table entry indicates that the first page table entry is associated with the active sparse status.

21. The system of claim 1, wherein the first request comprises a write operation to data that is not resident in the memory.

22. The system of claim 1, wherein the first request comprises a read operation for data that is not resident in the memory.

* * * * *

UNITED STATES PATENT AND TRADEMARK OFFICE
CERTIFICATE OF CORRECTION

PATENT NO. : 9,754,561 B2  Page 1 of 1
APPLICATION NO. : 14/046064
DATED : September 5, 2017
INVENTOR(S) : Jonathan Dunaisky et al.

It is certified that error appears in the above-identified patent and that said Letters Patent is hereby corrected as shown below:

In the Claims

Column 17, Claim 10, Line 62, delete "first" before mapping;

Column 18, Claim 13, Line 22, delete "first";

Column 19, Claim 19, Line 13, delete "manacling" and insert --managing--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*